United States Patent
Nissl et al.

(10) Patent No.: US 6,530,023 B1
(45) Date of Patent: Mar. 4, 2003

(54) METHOD AND DEVICE THAT VALIDATES TIME OF AN INTERNAL SOURCE USING AN EXTERNAL SOURCE

(75) Inventors: Klaus Nissl, München (DE); Matthias Meinhold, Nürnberg (DE)

(73) Assignee: TimeSafe TrustCenter GmbH, Nuremberg (DE)

(*) Notice: Subject to any disclaimer, the term of this patent is extended or adjusted under 35 U.S.C. 154(b) by 0 days.

(21) Appl. No.: 09/043,017

(22) PCT Filed: Sep. 4, 1996

(86) PCT No.: PCT/EP96/03893

§ 371 (c)(1),
(2), (4) Date: May 20, 1998

(87) PCT Pub. No.: WO97/09802

PCT Pub. Date: Mar. 13, 1997

(30) Foreign Application Priority Data

Sep. 4, 1995 (DE) .......................... 195 32 617

(51) Int. Cl.⁷ .......................... G06F 11/30; H04L 9/00; H04K 1/00; G09C 3/00
(52) U.S. Cl. .......................... 713/200; 713/165; 713/178; 713/180; 380/25; 380/49; 380/54; 380/59; 380/258
(58) Field of Search .......................... 713/161, 165, 713/178, 180, 400, 500; 714/731, 744; 380/258, 25, 49, 54, 59

(56) References Cited

U.S. PATENT DOCUMENTS 5,001,752 A    3/1991   Fischer
5,136,643 A  * 8/1992   Fisher .......................... 713/178
5,189,700 A  * 2/1993   Blandford
5,444,780 A    8/1995   Hartman, Jr.
5,539,802 A  * 7/1996   De Caluwe et al. ........ 713/178

FOREIGN PATENT DOCUMENTS

| DE | 44 11 780 | 10/1995 |
|---|---|---|
| EP | 516 898 | 12/1992 |
| EP | 624 014 | 11/1994 |
| WO | WO 923/03000 | 2/1992 |

OTHER PUBLICATIONS

Article entitled "Sichere Übertragung und Archivierung Elektronischer Dokumente" dated Mar. 1991, pp. 120–130 written by Prof. Dr. Christoph Ruland in DataCom.

Article entitled "Telekommunikation Band 3" by Heinz Schulte written in Jun. 1994, 10 pages.

Article entitled "Arbitration in Tamper Proof Systems" pp. 216–222, by George I. Davida and Brian J. Matt.

* cited by examiner

*Primary Examiner*—Gail Hayes
*Assistant Examiner*—Jenise Jackson
(74) *Attorney, Agent, or Firm*—Staas & Halsey LLP

(57) ABSTRACT

Digital data is provided with a time stamp of an internal time signal of an internal clock. The internal time signal is validated by receiving and evaluating an internal broadcast or a cable signal of an external time source, from which a standard time can be derived, comparing the standard time with the internal time signal of the internal clock, and time stamping the digital data. The digital data is time stamped only if a time difference between the internal and external time signals lies within a given tolerance range. Finally, the time-stamped digital data is encrypted.

33 Claims, 9 Drawing Sheets

METHOD AND DEVICE THAT VALIDATES TIME OF AN INTERNAL SOURCE USING AN EXTERNAL SOURCE

BACKGROUND OF THE INVENTION

1. Field of the Invention

The present invention is directed to securing digital data for storage and transmission and, more particularly, to a system for sealing computer data using a time stamp and encryption.

2. Description of the Related Art

There has been a tremendous upsurge in recent years in the exchange of data and information by computer, fax, telex and other electronic media. The growing use of electronic data processing in all fields, in light of the quality and quantity of the data processed, has created a whole new dimension in the demand for data security. As daily press reports indicate, this is especially true in the area of remote data transmission. For example, see "Internet is Not Suitable for Sensitive Data" ("Internet ist für sensible Daten nicht geeignet") in *Ärzte-Zeitung* 14, No. 86, May 11, 1995, and "Don't Trust Anyone per Fax" ("Trau' keinem über Fax") in *PraxisComputer* No. 1, Feb. 10, 1995, p. 15.

The demand for data sealing, document authenticity and legally binding communications is becoming ever louder. It is only a matter of time until legislators devise applicable guidelines. The text of an interview with Dr. Winfried Schorre and Horst Seehofer on this subject, entitled "Make Better Use of Scarce Resources" ("Knappe Ressourcen besser nutzen"), appeared in *PraxisComputer* No. 5, Aug. 10, 1995, p. 36.

To illustrate the current situation, several possible opportunities for manipulation are described briefly below.

Example: Medicine

A surgeon dictates a post-operative report, which is then entered into the computer by administrative personnel. It is later found that the surgeon made a mistake: for example, removing a cataractous lens on the basis of a pre-operative diagnosis—but from the wrong eye. Afterward, the surgeon attempts to manipulate the pre-operative findings (cataractous left lens) to clear himself (cataractous right lens).

Example: Finance

Exchange-rate transactions are carried out at timepoint t1. At timepoint t2, the rate has dropped. Post-facto manipulation is undertaken to fraudulently avoid a loss.

Example: Research

Who was the first to document an invention?

Example: Law

A written record of testimony is made. For use in court, document authenticity is required.

Example: Data Exchange

A letter of discharge for a psychiatric patient is to be sent by modem to the patient's family physician. The authenticity of the receiver must be ensured, and unauthorized access to confidential documents must be prevented. See: "Pledge of Secrecy and Data Networks" ("Schweigepflicht und Datennetze") in *Praxis-Computer* No. 6, Oct. 15, 1994, p. 5.

The Federal Physical Technical Agency in Braunschweig broadcasts the time of day, as determined by a cesium clock, via radio waves from Mainflingen. The broadcast signals can be received within a radius of 1500 to 2000 km. For details, see "DCF Reception Technology" ("DCF Empfangstechnik") in *ELV-Journal* June 1994, pp. 27 ff.

Receiver modules for broadcast time signals have achieved a high technical level (as discussed in *Design&Electronik* 10, May 16, 1995, No. 242: "Industrial Clocks in the Atomic Age" ("Industrie-Uhren im Atomzeitalter")). Such receivers provide the date and time of day, referred to hereinafter as "standard time," on a minute by minute basis.

Time signals also exist in foreign countries, e.g., MSF (England) and WWVR (United States). Furthermore, a time signal is contained in the Global Positioning System (GPS, see below).

For as long as there has been information, there has been the desire to shield information from general access by encryption. The security of the key used correlates with the quality of the key algorithm.

Various encryption methods are available for protecting the secrecy of confidential data. These methods offer more or less data security, in keeping with their costs. A basic distinction is made between symmetrical methods (crypto procedures as per Feal, DES, etc.) and asymmetrical methods (RSA, PGP, etc.).

Various attempts to achieve document authenticity and legally binding communications have thus far yielded no satisfactory solution. The equivalence of a digital signature to a personal handwritten signature is the object of intensive research, as outlined in the articles "Crypto Envy" ("Crypto-Neid") in *c't Magazin* 1995, Vol. 6, p. 46 and "Single Chip Controllers for Crypto-Cards" ("Single-Chip-Controller für Kryptokarten") in *Design&Electronik* 14/15, Jul. 18, 1995, No. 212. Compared with encryption alone, digital signatures offer a variety of advantages (Glade, A., Reimer, H., Struif, B.: "The Digital Signature and Security-Sensitive Applications" ("Digitale Signatur und sicherheits-sensitive Anwendungen"), Wiesbaden 1995).

The post-facto vulnerability of electronic data to manipulation represents a problem that has not yet been solved. In the legal sense, a file becomes a document only by virtue of being published, including a date and signature. However, in view of the abundance of data and the speed with which data is produced and destroyed (data turnover), that method reaches the limits of the possible.

The growing exchange of data by computer, fax and other media, as well as the permanently increasing number of networks on the national and international lever (Internet, etc. See: "Internet is Not Suitable for Sensitive Data" ("Internet ist für sensible Daten nicht geeignet") in Ärzte-Zeitung 14, No. 86, May 11, 1995), makes adequate measures for data security a necessity. For more information, see: "Don't Trust Anyone per Fax" ("Trau' keinem über Fax") in *PraxisComputer* No. 1, Feb. 10, 1995, p. 156, May 11, 1995 and "Data Keys, Foundations of Cryptology ("Datenschlösser, Grundlagen der Kryptologie") in *c't Magazin* 1994, Vol. 8, pp. 230 ff.

SUMMARY OF THE INVENTION

An object of the invention is therefore to provide a method and a device for sealing electronic data that protect the sealed data against unauthorized access or manipulation and can be used in stationary operation (PCs, etc.) as well as during transport (fax, etc.).

Pursuant to this object, and others which will become subsequently apparent, one aspect of the present invention resides in a method for sealing digital data, whereby the digital data is provided with a time stamp of an internal time signal of an internal clock. The method includes the steps of receiving and evaluating an internal broadcast or a cable signal of an external time source, from which a standard time can be derived, comparing the standard time with the internal time signal of the internal clock, time stamping the digital data, if a time difference between the internal and external time signals lies within a given tolerance range, and encrypting the time-stamped digital data.

The object is achieved by incorporating, during the encryption process, a signal that contains the standard time and an authentication code. Decryption is carried out by the person or persons having the key, and the file is checked for possible modifications (manipulation).

Figure 1:
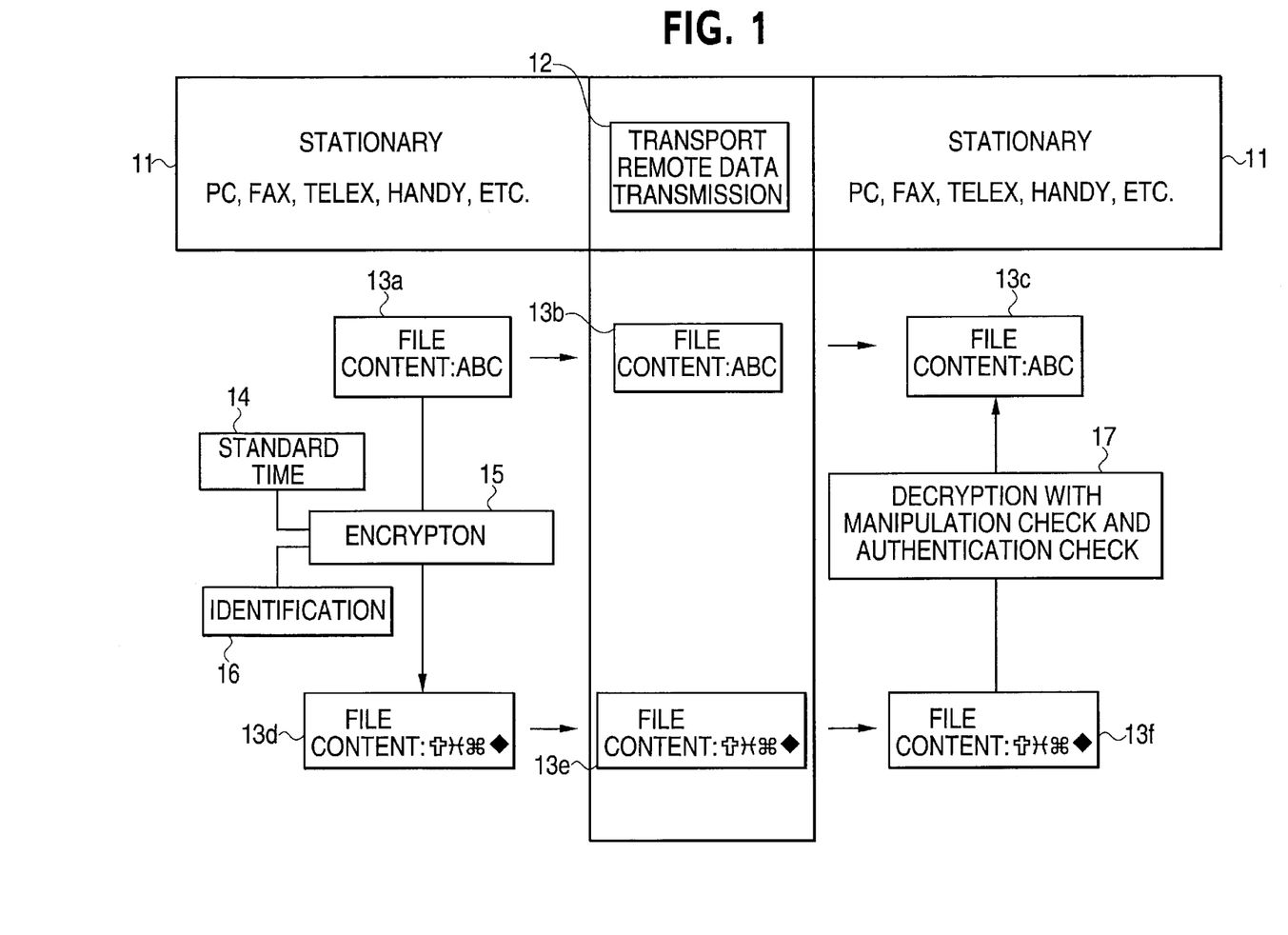
FIG. 1 is a data flow diagram of the communication of a sealed file.

The method and device described here ensure that access to the sealed data remains blocked, as a rule, and thus constitute a significant step toward document authenticity and legally binding communications (see FIG. 1: Data Flow Diagram).

For data transport, this means that the authenticity of transmitter and receiver is guaranteed, while unauthorized access to the transmitted data is prevented by the simultaneous encryption.

The method and device for sealing computer data by a combination of standard time incorporation, authentication and encryption thus protects the sealed data against unauthorized access or manipulation, both in the area of stationary electronic data processing (example: PC plug-in cards) and in that of remote data transmission (example: additional circuit boards).

To upgrade on the PC level, a plug-in card is favored. For data transmission devices, an additional or "daughter" circuit board is preferred. Of course, technology attempts to miniaturize such circuits and compress them into the smallest possible area. It is also possible, particularly in new devices, to implement a user-specific IC (ASIC) solution, depending on the number of pieces produced. The device according to the invention can also be connected to a PC (i.e., to computers in general) by any desired interface (serial, parallel, PCMCIA adapter).

Figure 3:
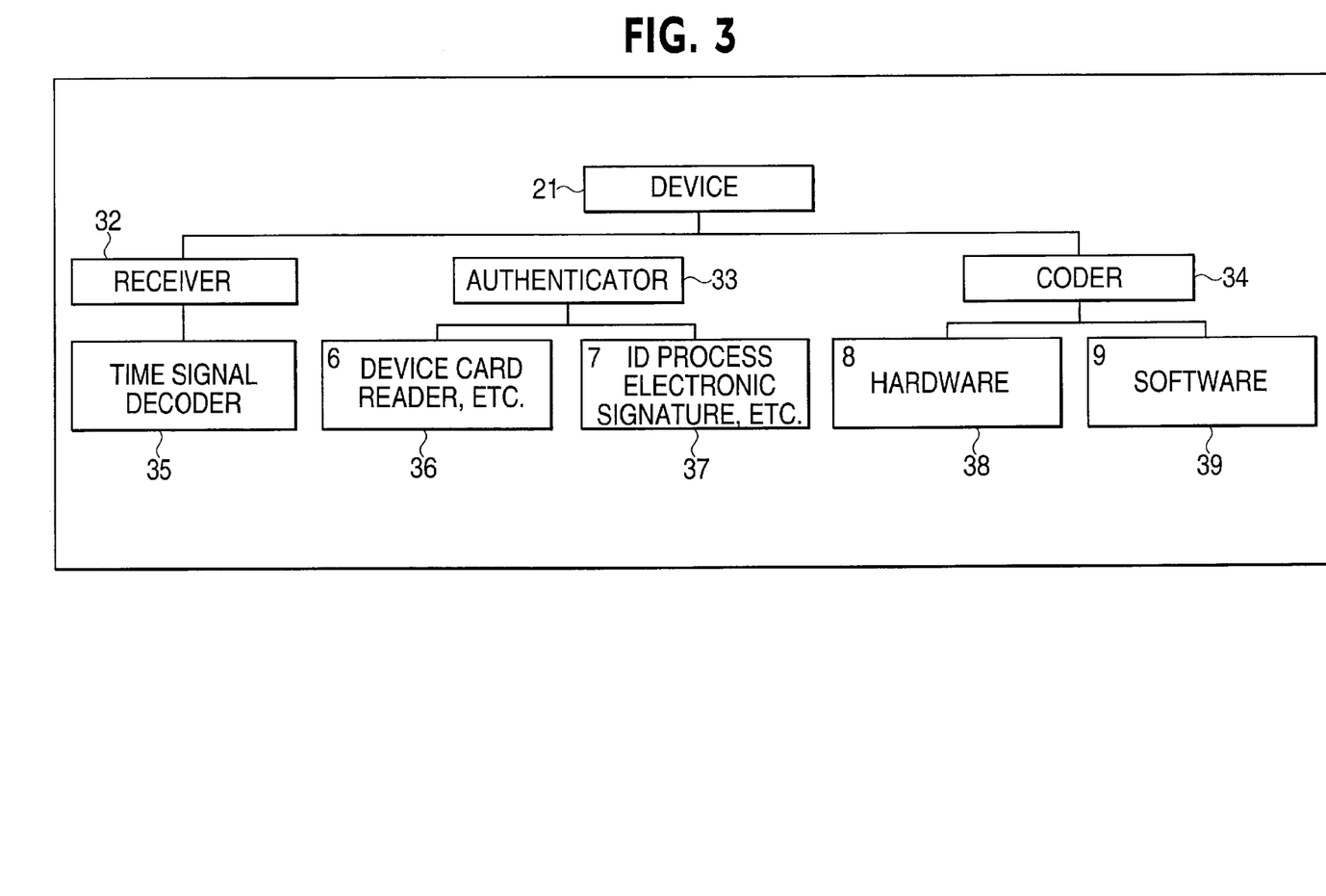
FIG. 3 is a schematic structural diagram of the device illustrated in FIG. 2.

The components of the device and the method are shown in FIG. 3.

The device comprises electronic components that must perform the following tasks:
  signal evaluation
  signal check
  provision of device identification number
  encryption of received signal
  manipulation check
Existing transmitter:
  The transmitter provides date and time-of-day information. Along with time signal transmitters, other signal carriers such as satellites, TV cables, telephones and TV transmitters, can be used. In addition, so-called "providers" (e.g., Telecom) can be granted the option to provide or incorporate signals.
Self-constructed transmitter:
  A self-constructed transmitter increases data security in the following ways:
  1. Provision of standard time in encrypted form.
  2. Variability of time of transmission.
  3. Mixing genuine and false information.
  4. Transmitter-receiver synchronization of limited duration.
  5. Mixing information from 1 through 4.
  6. Bidirectional signal for signal transmittal.
  The nature of the receiver depends on that of the transmitter. In principle, broadcast and cable signals can be received. A suitable logic analyzes the received signals.

In the case of broadcast time signals, authenticity is checked, in the absence of specific additional signals, via the up-link numbers of the time pulse. That is, in the event of any manipulation, inputs with earlier dates than the last retrieved genuine data time signal would be recognized as manipulation. In addition, the received signal is compared with an internal clock (real time clock: RTC), and time differences outside of a control range point to manipulation.

Authentication is carried out by a device and/or a method that establish, beyond any doubt, the identity of the transmitter or receiver of a message.

Electronic signatures are currently the subject of research. For example, see: "Single Chip Controllers for Crypto-Cards" ("Single-Chip-Controller für Kryptokarten") in *Design&Electronik* 14/15, Jul. 18, 1995, No. 212. Other devices and methods are also suitable for proof of authenticity (card readers, fingerprint readers and transponder systems as described, for example, in the article "Contact-Free Identification" ("Berührungslose Identifikation") in *Design&Electronik* No. 283).

Modification of the time signal is carried out by hardware (GAL, PAL and/or other hardware encryption processes, such as the clipper chip, discussed in "NSA and the Clipper Chip" ("Die NSA and der Clipper-Chip"), *c't Magazin* 1994, Vol. 9, p. 24) and/or by software (encryption algorithms, e.g., using the RSA method; for details, see "Data Keys, Foundations of Cryptology ("Datenschlösser, Grundlagen der Kryptologie") in *c't Magazin* 1994, Vol. 8, pp. 230 ff.). Decryption can be carried out only by someone who has the key to the modification logic.

Figure 5:
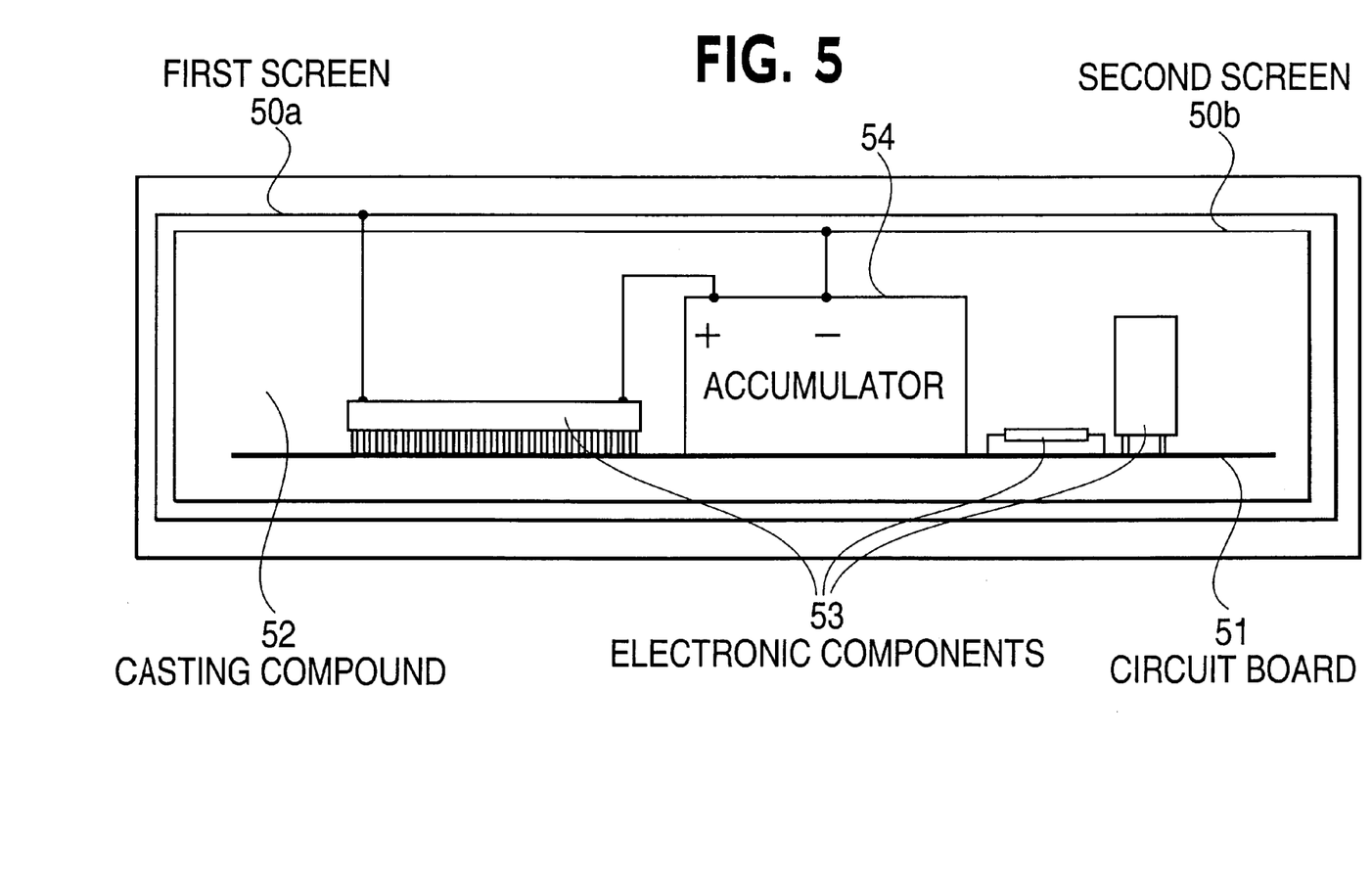
FIG. 5 is cross-sectional side view of a device providing protection against unauthorized picking out of programmed components of the device according to the invention.

To prevent mechanical manipulation, the chip or the components of the plug-in card are integrally cast and use an electrical-mechanical connection technique, so that later picking out of microprocessor elements is made more difficult. As FIG. 5 shows, contact with the protective grids A and B results in deletion of the programmed components; this is called the "black box" solution.

Data manipulation is recognized by a parity check and other mathematical and/or hardware checking processes. Security increases along with the complexity of the checking methods.

In the United States, independent organizations for data protection have established a so-called "trust center" to serve as a trusted third party in data protection. Its activities relate to encryption and decryption and to key distribution and storage as well as to cooperation with providers and suitable notarization for the impartial certification of communications keys, etc. For more details, see "Much is Possible with Chip Cards" ("Mit Chipkarten ist vieles m öglich") in *PraxisComputer* No. 2, Mar. 10, 1995, pp. 16–17.

Along with identification (e.g., a signature), a document contains data and, in some cases, the time and location of its creation. Via satellite localization (Global Positioning System), this location can be adequately identified and incorporated into the document in the same fashion as the standard time, for example.

Figure 7:
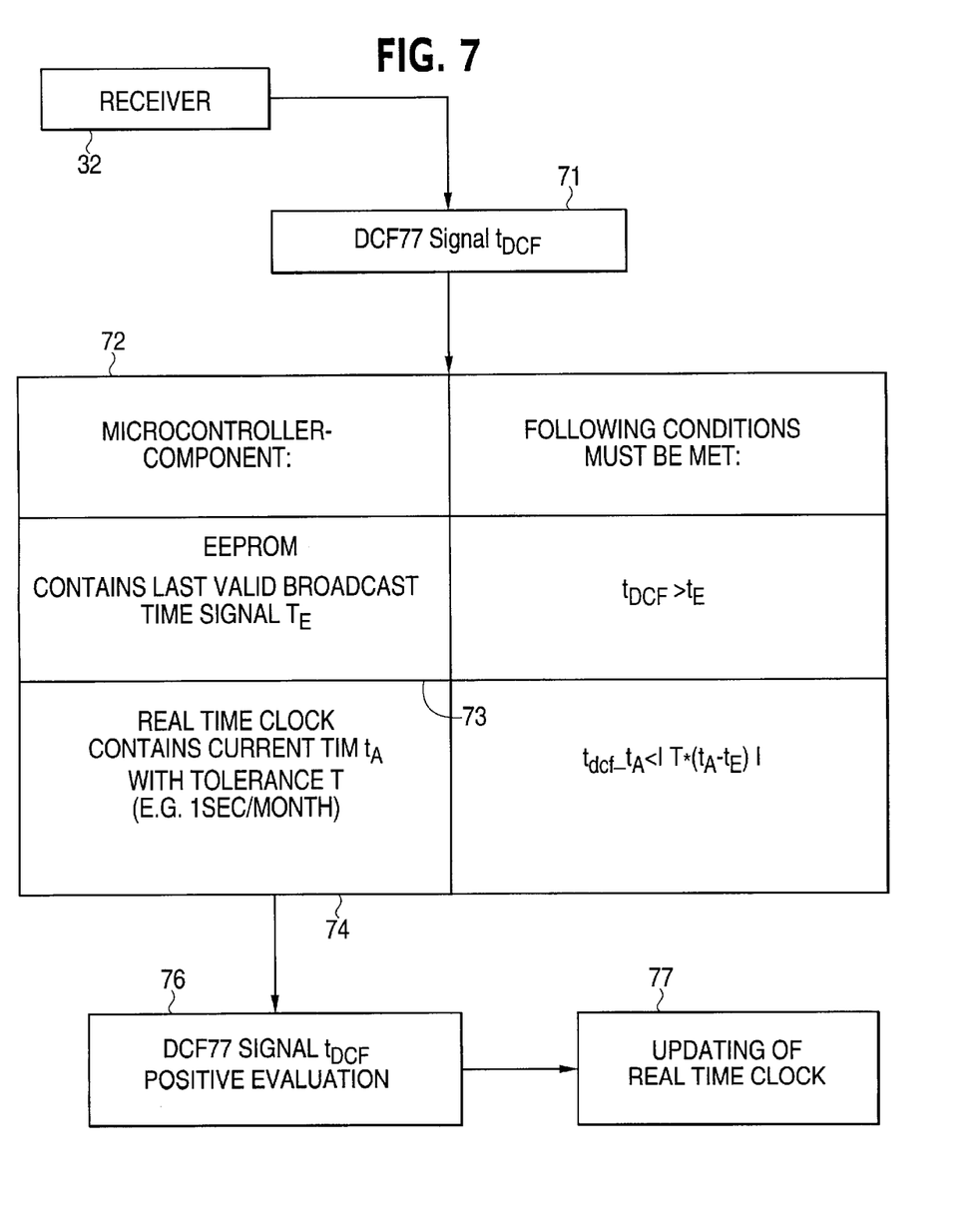
FIG. 7 is a functional block diagram of components performing validation of an external time signal, e.g., a DCF77 signal, as well as subsequent updating of real time clock.

If the device is embodied as a PC plug-in card, the DCF77 time signal broadcast by the Federal Physical Technical Agency in Braunschweig can assume the role of transmitter. Receivers of time signals are found in various embodiments (sizes, receiver characteristics). The received signal is demodulated and amplified as a 100 or 200 ms pulse per second and then passed on to the PC plug-in card for analysis. A microcontroller on the plug-in card converts the received signal pulse into time information and stores the last received time via a special logic tailored individually to each plug-in card. Validation of the DCF77 signal is shown in FIG. 7.

Figure 6:
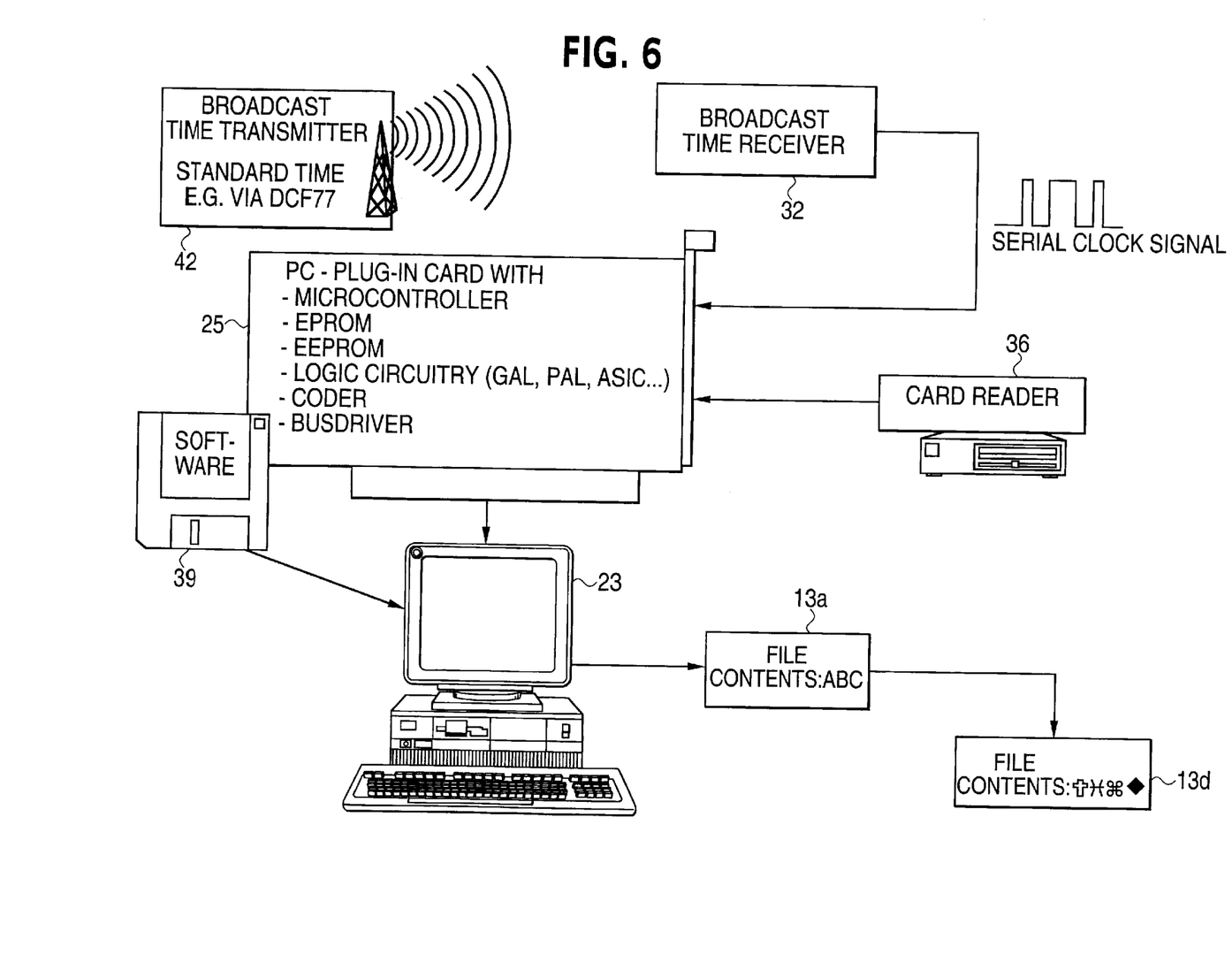
FIG. 6 is a flow diagram of a process according to the present invention in which the device according to the invention is realized as a plug-in card of a PC.

Each plug-in card has an individual identification number. Hardware and software use these numbers for machine identification. The components for reception, authentication and encryption do not necessarily need to all be located on the card itself, as the example of the plug-in card in the PC in FIG. 6 shows.

By a signature procedure (e.g., MD5, Message Digest 5 of Ron Rivest), the the original file is provided with a header (information on relevant variables such as operating system version and file size) and, with a defined part of the original file itself, is formed into a block, which in the present case assumes a size of 4 kbyte (so-called "4 kblock").

The microcontroller software accesses the time signal, incorporates it into the 4 kblock, encrypts the 4 kblock inside the black box, and attaches the time-stamped digital signature to the original file. Optionally, this can be separately stored or encrypted again together with the original file (see FIG. 8).

Decryption can be carried out only by a keyholder. A check for post-facto manipulation is carried out at that time by a signal check.

If the device according to the invention is embodied as an additional circuit board, the preconditions for transmitter and receiver are the same as when the device is realized as the PC plug-in card (see above).

Along with document authenticity, data security during transport is of decisive importance in the area of remote data transmission. Before being transmitted, data is encrypted as described, with incorporation of the time signal. Encryption and decryption are carried out by logic components, which must be integrated in the smallest possible space, in keeping with the basic requirements of data transmission devices. The encryption software is stored in the EPROM, for example. The encryption hardware can comprise a clipper chip, for example.

Along with the above security precautions, the time signal, by establishing the transmission and reception times of true and false information, creates further barriers against unauthorized access and/or manipulation.

BRIEF DESCRIPTION OF THE DRAWINGS

A preferred embodiment is described below in reference to the accompanying drawings, in which.

DETAILED DESCRIPTION OF THE PREFERRED EMBODIMENTS

FIG. 1 is a data flow diagram of a file 13a that is encrypted 15 and transmitted by a transmitter and then decrypted 17 by a receiver. To encrypt 15 the data, a signal that contains the standard time 14 from an external source as well as an authentication code 16 are incorporated. On the transmitter side, there is a file 13a of the contents ("abc"); for example, in a PC, fax, telex, handy or the like 11. This file 13a can be transmitted to the receiver side via a transport level 12, e.g., via remote data transmission. The data contents, in this case, could be manipulated. The receiver side comprises the same components as the transmitter side, i.e., a PC, fax, telex, handy or the like 11. To prevent post-facto manipulation of the file 13c, and thus to attain document authenticity, the transmitter-side file 13a with the contents "abc" is subjected to encryption 15, whereby a validated standard time 14 (external) and an identification 16 are incorporated into the encryption 15. The file 13d encrypted in this fashion is then transmitted (see file 13e) via the transport level to the receiver with non-readable contents. On the receiver side, the transmitted encrypted file 13f is decrypted 17 by a keyholder, whereby a manipulation check and an authentication check are carried out. After this, the file 13c again exists in readable form with the contents "abc."

Figure 2:
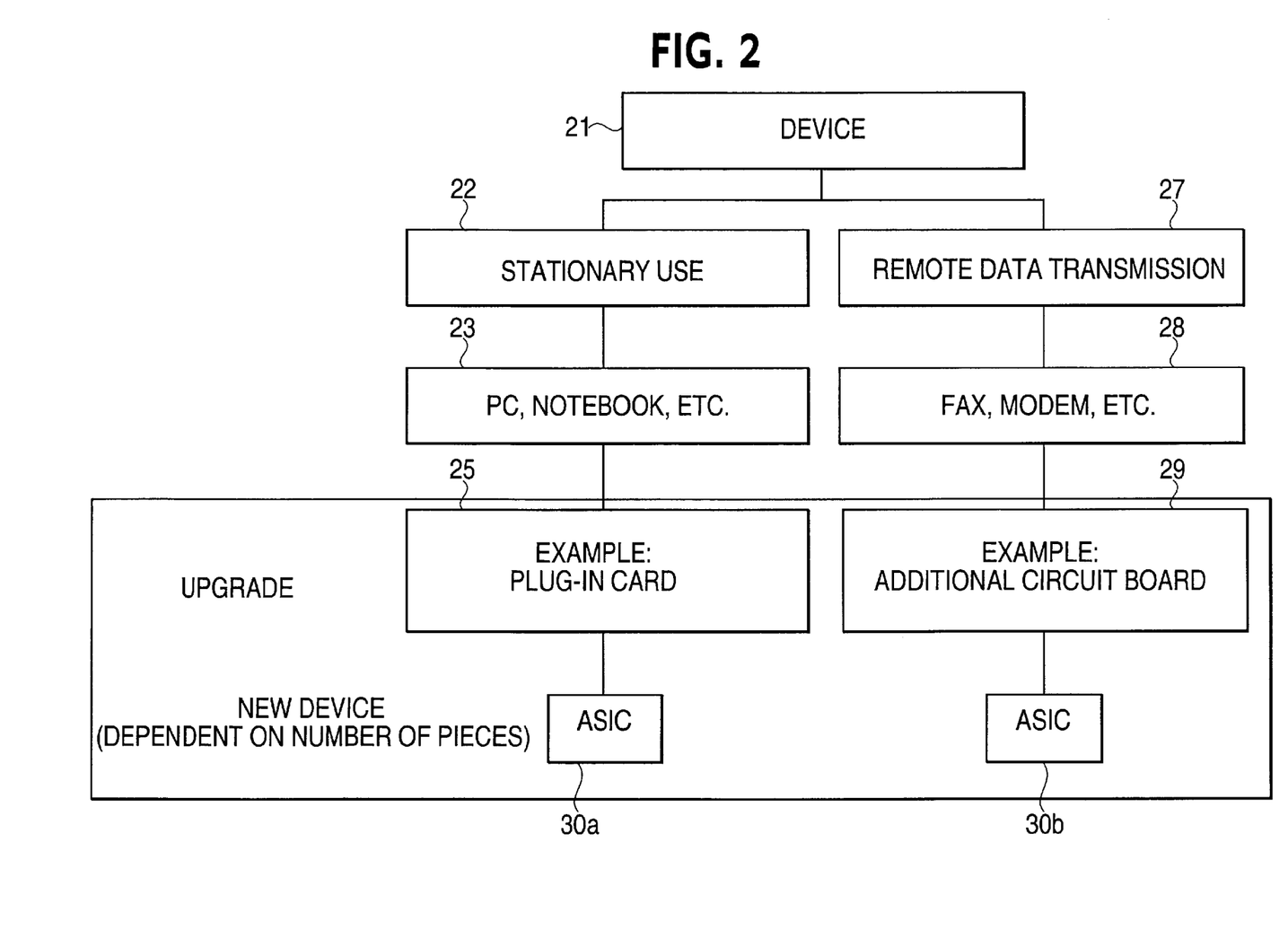
FIG. 2 is a logic tree diagram of a possible embodiment of a device according to the present invention

FIG. 2 is a logic tree diagram of a possible embodiment of device 21 according to the invention for sealing computer data. During stationary use 22 of the device 21, e.g., in a PC, notebook computer or the like 23, the device 21 can be embodied in the form of an added circuit board (plug-in card) 25 when the stationary device is upgraded. In the case of a new device or an initial outfit, the device according to the invention can be realized by an integrated circuit, e.g., an ASIC 30a. If the device according to the invention is used in a non-stationary fashion 27, i.e., to transmit data in a fax, modem or the like 28, the device according to the invention can be realized, during an upgrade, for example, by an additional circuit board 29. In a new device, the device according to the invention is realized by an integrated circuit, e.g., an ASIC 30b, as in the stationary case.

FIG. 3 is a schematic structural diagram of the device 21 according to the invention, comprising the superordinate components of receiver 32, authenticator 33 and coder 34.

The receiver 32 receives information on the date and the time of day. It is also possible for information on location (e.g., from a GPS signal) to be incorporated. This information is decoded; in the present embodiment, for the sake of clarity, a time signal decoder 35 is specified, for example. The transmitter of the date, time-of-day and/or location information can be one of the aforementioned sources, including a transmitter built specifically for this purpose.

The authenticator 33 establishes the identity of the transmitter or receiver of the message or file. This can be done, for example, by a card reader 36. Authentication can also be carried out by an identity process, such as an electronic signature.

The coding of the device can be carried out by a coder 34 using suitable hardware 38, e.g., a clipper chip, or suitable software 39, such as a coding algorithm.

Figure 4:
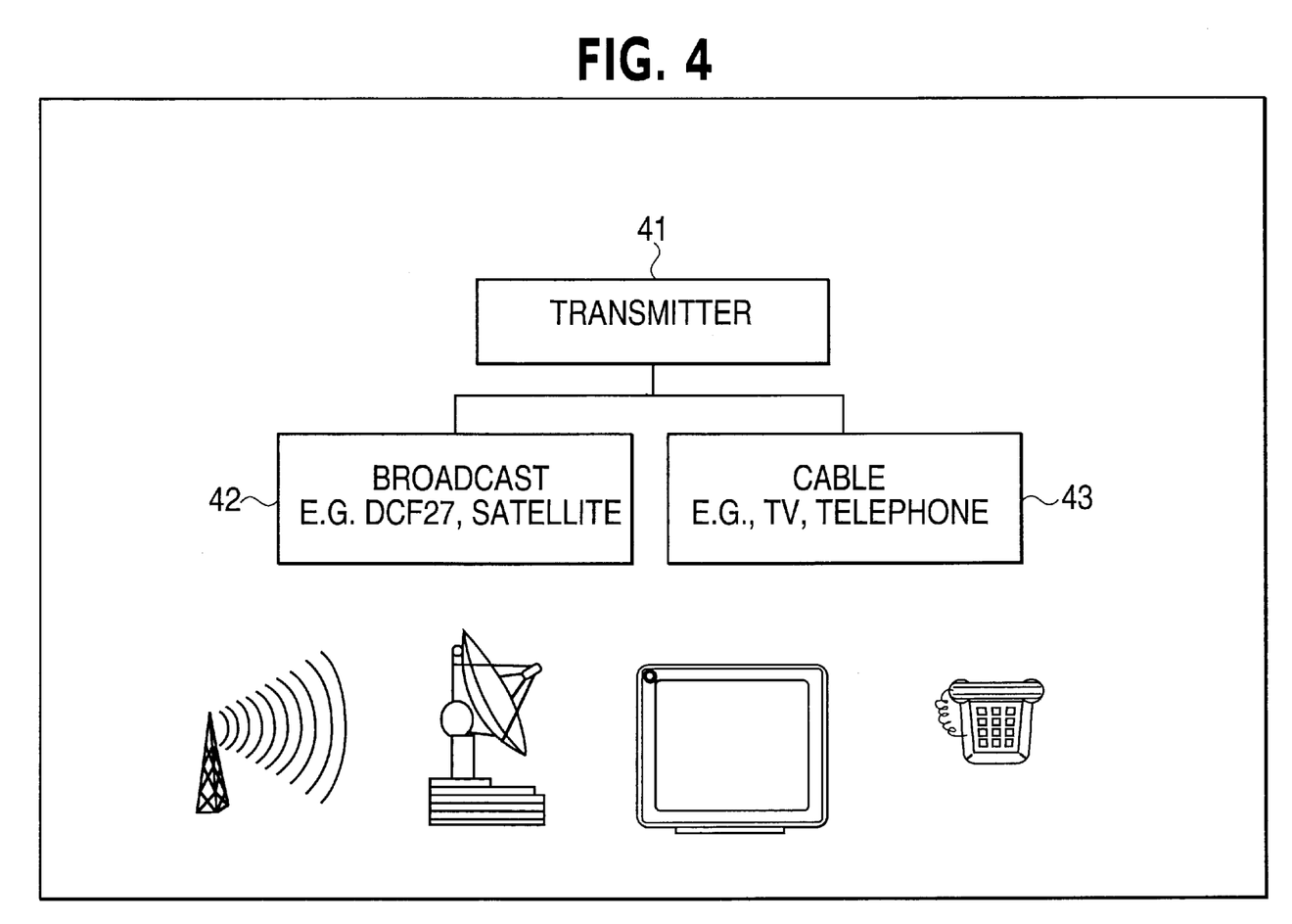
FIG. 4 is an illustration of transmission alternatives for distributing the time signal.

FIG. 4 shows an incomplete overview of possible transmitters 41 of a suitable time signal. The required time signal can be transmitted via broadcast 42, e.g., as a DCF77 signal of the Federal Physical Technical Agency in Braunschweig, or via satellite. Transmission of the time signal via cable 43 in a television or telephone signal is also possible.

FIG. 5 shows a protective device against unauthorized picking out or manipulation of the programmed components of a device according to the invention. The depicted "black box" solution comprises two protective screens embodied as the first screen 50a and second screen 50b, which surround the device according to the invention. The electronic components 53, which are arranged on a board 51, and the screens 50a, 50b are cast in a casting compound 52. Further, arranged in the device is an accumulator 54, the potential of which is connected to the screening components 50a, 50b and programmed components 53 in such a way that contact (short circuit) between the two screens 50a, 50b, for example, would result in deletion or destruction of the connected components 53.

FIG. 6 shows an embodiment of the method or device according to the invention as a plug-in card 25 in a PC 23 and the necessary functional parts. A broadcast time transmitter 42 transmits the standard time, e.g., as a DCF77 signal (Federal Republic of Germany).

A suitable broadcast time receiver 32 converts the broadcast time signals into a serial clock signal, which, in the device according to the invention, is implemented as a PC card 25. The PC plug-in card 25 comprises a microcontroller 72 (FIG. 7), an EPROM, an EEPROM 73, logical circuits, e.g., GALs, PALs and ASICs, and a bus driver. Furthermore, a suitable signature is entered via a card reader 36. By software 39 and the plug-in card 25, in the PC 23, the file 13a with the contents "abc" is encrypted, time-stamped and signed, resulting in the file 13d to be transferred with the required encrypted contents.

FIG. 7 shows the validation of the received time signal in the microcontroller 72 of PC plug-in card 25 in FIG. 6. A receiver component 32 supplies a DCF77 signal tDCF to the microcontroller 72. The EEPROM 73 of the device contains the last valid time signal tE, whereby the condition tDCF>tE must be met. A real time clock 74 located in the device according to the invention, which can be realized as an independent component or by a microcontroller, contains the current time tE with a tolerance T of, for example, 1 sec/month. The comparison TDCF−tA<*T(tA−tE) is carried out. If the comparison is positive 76, the DCF77 signal is used for time stamping and the real time is updated 77.

Figure 8:
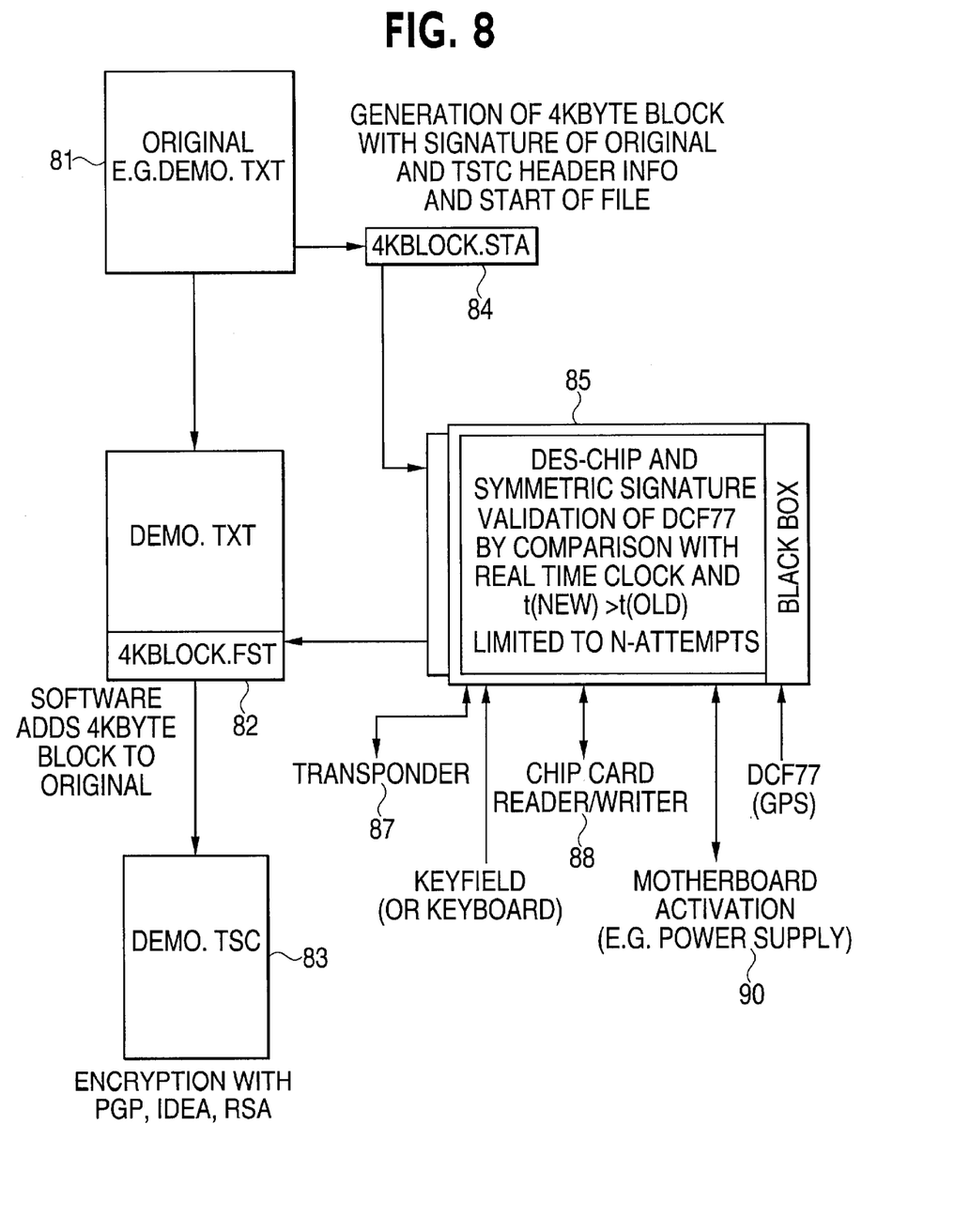
FIG. 8 is a functional block diagram of incorporation of standard time during encryption.

FIG. 8 shows, schematically, the incorporation of standard time during encryption. A signal is produced from an original file ("demo.txt") 81 by a signature procedure and provided with a header. From this, with a defined part of the original file, a so-called 4 kbyte block ("4 kblock.sta") 84 is generated. In the black box 85, the microcontroller 72 accesses the time signal DCF77 (or GPS) and carries out the validation procedure of the DCF77 described in FIG. 7. The procedure is limited to n-attempts. The validated time signal is built into the 4 kbyte block and encrypted in the black box 85. The encrypted 4 kbyte block ("4 kblock.tst"), i.e., the so-called time-stamped digital signature 82, is attached to the original file ("demo.txt") 81 by software via the PC bus. Optionally, the combination of the original file "demo.txt" and the signature "4 kblock.tst" can be separately stored or together encrypted again to form a file "demo.tsc " 81. Further inputs and outputs of the black box are motherboard activation 90, chip card reader/writer 88 and transponder 87.

Figure 9:
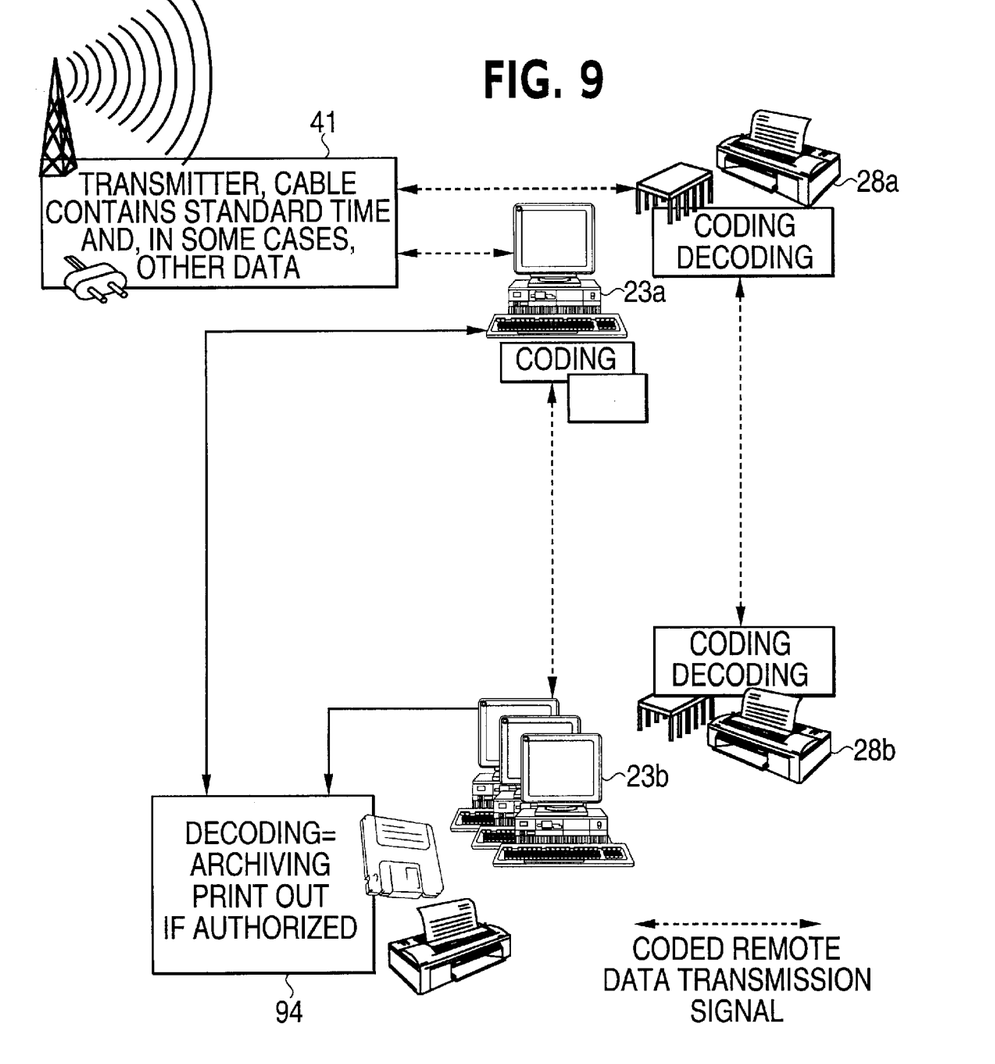
FIG. 9 is a flow diagram of a method for sealing computer data.

FIG. 9 shows a total overview of the method and device for sealing computer data for "stationary" as well as "remote data transmission" use. The standard time (and, as applicable, other information) is supplied by a time transmitter or cable 41 to a transmitting PC 23a or remote data transmission device, e.g., a fax machine 28a, which carries out the coding/decoding of the given data (file). The encrypted file is transmitted by remote data transmission (dashed lines indicate a coded remote data transmission signal). The transmitting PC 23a or transmitting FAX 28a is connected to a receiving PC 23b or receiving FAX 28b by a suitable data transmission route. The transmitting/receiving functions can be interchanged, as applicable. Decoding, archiving or printing out is possible 94, if authorization exists, on both the transmitter and the receiver side.

What is claimed is:

1. A method for sealing digital data with a time stamp of an internal time signal of an internal clock, comprising:

reception and evaluation of an external broadcast or cable signal of an external time source, from which the standard time can be derived, comparison of the standard time with the internal time signal of the internal clock, time stamping of the digital data, if the time difference between the internal and external time signals lies within a given tolerance range, and encryption of the time-stamped digital data.

2. A device for sealing digital data with time stamping, comprising:

a receiver for receiving and evaluation an external broadcast or cable signal of an external time source, from which the standard time can be derived as an external time signal, an internal clock for generating an internal time signal, a comparer for comparing the determined external normal time with the internal time, means for time stamping the digital data when a time difference between the internal and external time signals lies within a given tolerance range, and means for encrypting the digital data after the time stamping.

3. A method for generating encrypted computer data, comprising:

receiving a first signal, via one of broadcast and cable, from which a standard time can be derived;

checking the first signal in real time; and generating an encrypted file using an encryption procedure incorporating the standard time into the encryption file, whereby subsequent manipulation of the encrypted file can be recognized.

4. A method for generating encrypted computer data, comprising:

receiving a first signal, via one of broadcast and cable, from which a standard time can be derived;

checking the first signal in real time;

generating an encrypted file using an encryption procedure incorporating the standard time into the encryption file, whereby subsequent manipulation of the encrypted file can be recognized; and transmitting a second signal via at least one of wireless and wired communication.

5. A method as recited in claim 3, wherein said receiving is performed automatically without involving a user.

6. A method as recited in claim 5, wherein the first signal contains an authentication code that adequately identifies a transmitter of the first signal.

7. A method as recited in claim 6, wherein the first signal is sent in encrypted form.

8. A method as recited in claim 7, wherein the first signal is transmitted and received at a point in time that itself is part of the encryption.

9. A method as recited in claim 8, wherein the first signal contains true and false information.

10. A method as recited in claim 9, wherein the first signal is a government broadcast time signal.

11. A method for generating encrypted computer data, comprising:
    automatically receiving, via one of broadcast and cable, a first signal in encrypted form, containing a government broadcast time signal and an authentication code that adequately identifies a telecommunication provider transmitting the first signal, where the point in time that the first signal is transmitted and received is part of the encryption and a standard time can be derived from the first signal;
    checking the first signal in real time;
    generating an encrypted file using an encryption procedure incorporating the standard time into the encryption file, whereby subsequent manipulation of the encrypted file can be recognized; and
    sending the encrypted file in a remote data transmission.

12. A method for generating encrypted computer data, comprising automatically receiving, via one of broadcast and cable, a first signal in encrypted form, containing a government broadcast time signal and an authentication code that adequately identifies a transmitter of the first signal, where the point in time that the first signal is transmitted and received is part of the encryption and a standard time can be derived from the first signal;
    checking the first signal in real time;
    determining a location where the method is being performed using a GPS system; and
    generating an encrypted file using an encryption procedure incorporating the location and the standard time in the encrypted file, whereby subsequent manipulation of the encrypted file can be recognized.

13. A device, connected to an authentication device, for generating encrypted computer data, comprising:
    a receiver to receive a first signal, via one of broadcast and cable, from which a standard time can be derived; and
    a processor, coupled to said receiver, to check the first signal in real time and to generate an encrypted file using an encryption procedure incorporating the standard time into the encryption file, whereby subsequent manipulation of the encrypted file can be recognized.

14. A device as recited in claim 13,
    further comprising a memory, coupled to or integrated in said processor, to store an identification number, and
    wherein said processor incorporates the identification number into the encryption file.

15. A device as recited in claim 14, wherein said processor performs hardware encryption.

16. A device as recited in claim 15, wherein the encrypted file is based on an original file provided with a signature.

17. A device as recited in claim 16, further comprising authentication components, coupled to or integrated in said processor, to authenticate, store, modify, check and pass along the first signal.

18. A device protected against manipulation of an internal clock in the device, comprising:
    a receiver to receive a first signal, via one of broadcast and cable, from which a standard time can be derived;
    a processor, coupled to said receiver, to check the first signal in real time and to generate an encrypted file, based on an original file provided with a signature, using hardware encryption to perform an encryption procedure incorporating the standard time and an identification number into the encryption file, whereby subsequent manipulation of the encrypted file can be recognized;
    a memory, coupled to or integrated in said processor, to store the identification number; and
    authentication components, coupled to or integrated in said processor, to authenticate, store, modify, check and pass along the first signal.

19. A device as recited in claim 18, wherein the device is integrally cast with said receiver, said processor, said memory and said authentication components protected by an electromechanical coupling.

20. A device as recited in claim 19, wherein the device is located on a computer main board or inside a device for remote data transmission.

21. A device as recited in claim 20, further comprising one of a PC plug-in card and a daughter circuit board on which said receiver, said processor, said memory and said authentication components are mounted.

22. A method for sealing digital data, comprising:
    obtaining an internal time signal from an internal clock;
    evaluating an external time signal from an external time source, received via one of a cable and a broadcast medium, to derive a standard time;
    comparing the standard time with the internal time signal;
    time stamping the digital data, if a time difference between the standard time and the internal time signal lies within a given tolerance range; and
    encrypting the digital data after said time stamping thereof.

23. A method as recited in claim 22, further comprising exchanging signals bidirectionally.

24. A method as recited in claim 22, wherein said obtaining of the internal time signal is performed without user involvement.

25. A method as recited in claim 22, further comprising inserting an authentication code in the digital data.

26. A method as recited in claim 22, wherein said encrypting includes transmitting and receiving the digital data at a point in time that itself is part of the encryption.

27. A method as recited in claim 26, wherein the digital data contains true and false information.

28. A method as recited in claim 27, further comprising:
    determining a location of where said method is performed using a global positioning satellite system; and
    adding the location to the digital data prior to said encrypting.

29. A device for sealing digital data, comprising:
    obtaining means for obtaining an internal time signal from an internal clock;
    evaluating means for evaluating an external time signal from an external time source, received via one of a cable and a broadcast medium, to derive a standard time;
    comparing means for comparing the standard time with the internal time signal;
    time stamping means for time stamping the digital data, if a time difference between the standard time and the internal time signal lies within a given tolerance range; and
    encrypting means for encrypting the digital data after said time stamping thereof.

30. A device as recited in claim 29, wherein said encrypting means further encrypts an identification number into the digital data.

31. A device as claimed in claim 30, and further comprising microprocessor means for authenticating, storing, modifying, checking and passing along the digital data.

32. A device, comprising means for protecting against manipulation of an internal clock in the device.

33. A device as recited in claim 29, further comprising enclosing means for enclosing said obtaining, evaluating, comparing, time stamping and encrypting means in an integrally cast and electromechanically coupled housing.

* * * * *